United States Patent
Dubey et al.

(10) Patent No.: US 7,241,125 B2
(45) Date of Patent: Jul. 10, 2007

(54) CENTER TOUCH METHOD AND APPARATUS FOR FORMING CONTACT LENSES

(75) Inventors: Dharmesh K. Dubey, Jacksonville, FL (US); Mark E. Schlagel, Jacksonville, FL (US); Andrew J. Wagner, Jacksonville, FL (US); James F. Kirk, Gainesville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 588 days.

(21) Appl. No.: 09/865,825

(22) Filed: May 25, 2001

(65) Prior Publication Data

US 2002/0185757 A1 Dec. 12, 2002

(51) Int. Cl.
*B29D 11/00* (2006.01)

(52) U.S. Cl. .................. 425/174.4; 425/808; 264/1.38

(58) Field of Classification Search ............. 425/174.4, 425/346, 808; 264/1.36, 1.38
See application file for complete search history.

(56) References Cited

U.S. PATENT DOCUMENTS

| | | | |
|---|---|---|---|
| 4,211,384 A * | 7/1980 | Bourset et al. ............. 249/160 |
| 4,402,659 A | 9/1983 | Greenbaum | |
| 4,786,444 A | 11/1988 | Hwang | |
| 4,865,779 A | 9/1989 | Ihn et al. | |
| 5,466,147 A | 11/1995 | Appleton et al. | |
| 5,820,895 A * | 10/1998 | Widman et al. ........ 425/436 R |
| 5,969,793 A | 10/1999 | Dobner | |
| 5,972,249 A | 10/1999 | Wrue et al. | |
| 5,981,618 A | 11/1999 | Martin et al. | |
| 6,033,603 A | 3/2000 | Lesczynski et al. | |
| 6,071,111 A | 6/2000 | Doke et al. | |
| 6,071,440 A | 6/2000 | Wang et al. | |
| 6,248,266 B1 * | 6/2001 | Gartley et al. ............. 264/1.36 |

\* cited by examiner

*Primary Examiner*—Donald Heckenberg

(57) ABSTRACT

A center touch method and apparatus for use in a contact lens station for use with a contact lens mold assembly comprising a first mold half and a second mold half. The center touch apparatus comprises a center touch engaging member having a center touch engaging surface for engaging a central portion of a non-molding surface of one of the mold halves. The center touch method comprising driving one of the mold halves toward the other mold half using the center touch engaging member to contact a central area of the non-molding surface of the one mold half.

13 Claims, 8 Drawing Sheets

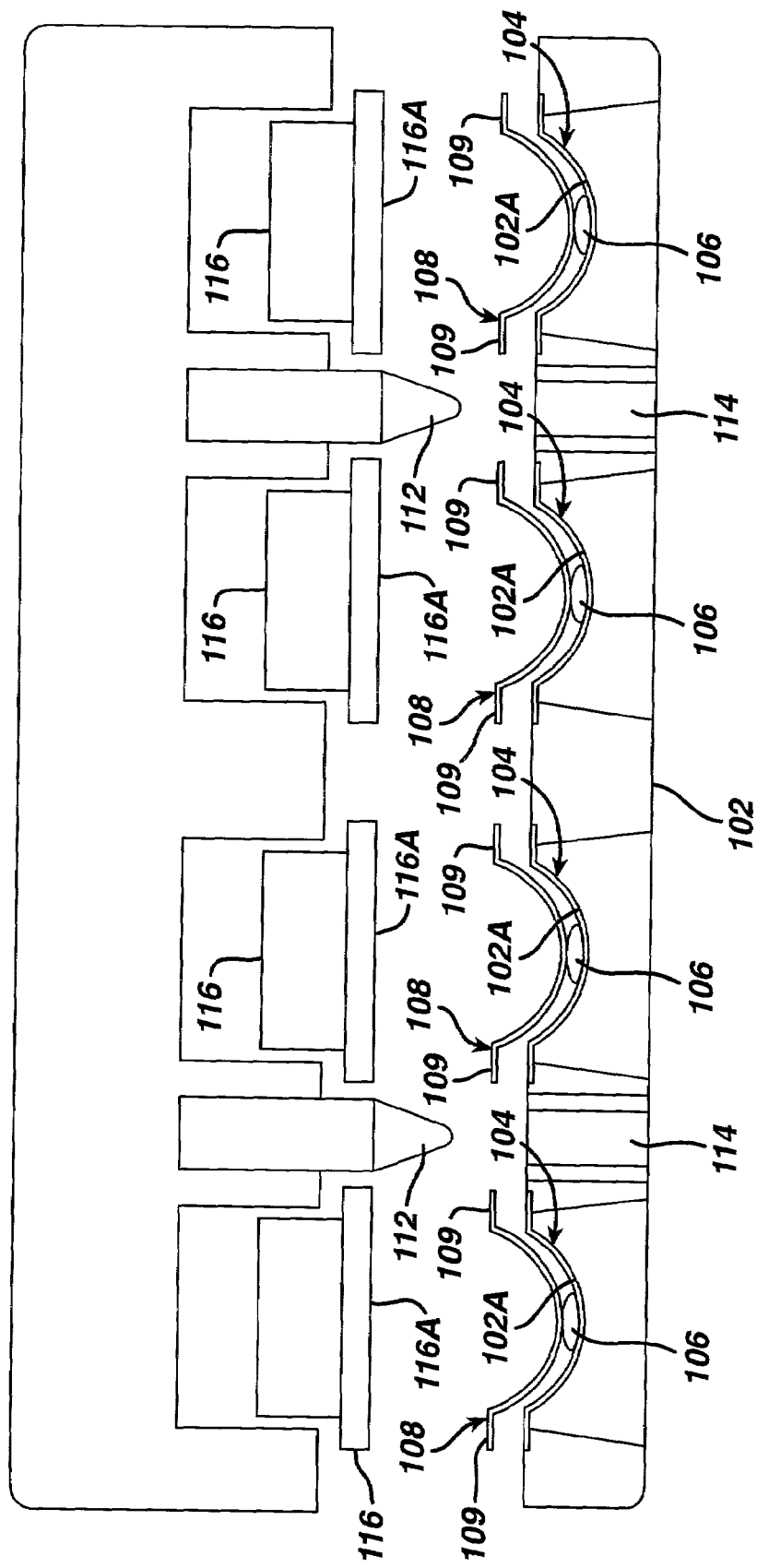

CENTER TOUCH METHOD AND APPARATUS FOR FORMING CONTACT LENSES

FIELD OF THE INVENTION

The present invention relates to contact lenses and, more particularly, to a method and apparatus for engaging a contact lens mold used to form a contact lens.

BACKGROUND OF THE INVENTION

Contact lens molds are used to form contact lenses in contact lens production systems. The contact lens molds consist of two mold halves which define a contact lens forming cavity therebetween. During production, a solidifiable contact lens material in liquid form is deposited into a first mold half and the other mold half is positioned over the first mold half. Mold engaging apparatus then closes the mold to shape and cure the liquid contact lens material to form a contact lens. To ensure that a suitable contact lens is manufactured, it is important that the two mold halves are mated precisely. If the mold halves are not mated precisely, lens abnormalities may result which could cause discomfort to the wearer and/or not accurately correct the wearer's vision.

FIG. 1 depicts a prior art contact lens molding apparatus for forming a contact lens. The molding apparatus comprises a front curve mold half 104, a back curve mold half 108, a carrier 102, and an engaging member 116. A liquid contact lens material 106 between the front curve mold half 104 and the back curve mold half 108 forms a contact lens between the mold halves during molding. The back curve mold half 108 is used to shape the surface of the contact lens which will be positioned on a wearer's eye and the front curve mold half 104 is used to shape the other surface of the contact lens. The contact lens formed between the mold halves 104, 108 contains a centrally located optical zone for vision correction surrounded by a peripheral zone used to correctly position and mount the contact lens on an eye. The front curve mold half 104 is supported by the carrier 102 and the back curve mold half 108 has flanges 109 for receiving the engaging member 116.

The engaging member 116 depicted in FIG. 1 contains an engaging surface 116A (represented by the bottom edge of the engaging member 116). The mold is closed, thereby shaping the contact lens material 106, by moving the engaging member 116 toward the carrier 102 to engage the flanges 109 on the perimeter of the back curve mold half 108 and drive it toward the front curve mold half 104. Typically, the shaped contact lens mold material is then cured (i.e., hardened) by subjecting the material to light.

Presently, contact lenses are produced using contact lens production line systems. The production line systems provide supporting carriers which move through a series of stations with different steps required to form contact lenses performed at each station. FIG. 2A and FIG. 2B depict a mold engaging station in a non-engaged state and an engaged state, respectively, and a carrier 102 which moves from station to station during the formation of the contact lenses. The carrier 102 contains a plurality of indentations 102A for receiving the molds and materials for forming contact lenses. An example of a contact lens production line system can be found in U.S. Pat. No. 6,071,440 to Wang et al., entitled Contact Lens Production Line Pallet System, incorporated fully herein by reference.

At a first station during the formation of contact lenses, the front curve mold halves 104 are placed into the plurality of indentations 102A of the carrier 102. The carrier 102 then moves from station to station where a liquid contact lens material 106 is deposited into the front curve mold halves 104, the back curve mold halves 108 are positioned over the front curve mold halves 104 containing the liquid contact lens material 106, and the front curve mold halves 104 and the back curve mold halves 108 are engaged and the contact lens material 106 is cured.

At the mold engaging station depicted in FIG. 2A and FIG. 2B, the engaging surfaces 116A engage the flanges 109 of the back curve mold halves 108 and drive the back curve mold halves 108 towards the front curve mold halves 104. Ideally, the portion of the back curve mold halves 108 which corresponds to the optical zones of the resultant lenses will not flex, excess liquid contact lens material 106 is able to be expelled, and the centers of the front curve mold halves 104 and of the back curve mold halves will be aligned so that a contact lens formed therebetween will have a desired shape (e.g., desired thicknesses) with little decentration (side-to-side difference between the center of the front surface of the contact lens and the center of the back surface of the contact lens). If the decentration and thicknesses are unacceptable, the lenses are discarded, thereby reducing production yields and driving up costs.

Decentration and improper thicknesses may result from improper alignment between the front curve mold halves 104 and the back curve mold halves 108 and flexing of the back curve mold halves 108 during the formation of the contact lenses. In contact lenses with decentration, the edges of the contact lenses may be uneven, causing discomfort to the wearer. In addition, improper thicknesses may affect the ability of the contact lenses to adequately correct a wearer's vision.

In addition, excess liquid contact lens material 106 between the mold halves 104,108 may need to be expelled to prevent lenses having improper thicknesses. Typically, when the back curve mold halves 108 are driven toward the front curve mold halves 104 a seal is created near the perimeter of the mold halves 104,108, thereby preventing excess liquid contact lens material 106 from being expelled. Once the flow of liquid contact lens material 106 is stopped, applying more force to the flanges 109 makes a tighter seal. The excess liquid contact lens material 106 trapped by the seal prevents the back curve mold halves 108 from seating all of the way in the cavities of the front curve mold halves 104, thereby further contributing to improper lens thicknesses.

Prior art systems attempt to resolve the problem of decentration by providing registration apertures 114 in the carrier 102 and corresponding registration pins 112 associated with the engaging members 116 in order to precisely align the engaging members 116 over the appropriate indentations 102A of the carrier 102. In these systems, however, when the back curve mold halves 108 are placed off center of the indentations 102A at a previous station, decentric lenses will still be formed as the engaging surfaces 116A attempt to drive the back curve mold halves 108 straight down.

In addition, even if the engaging members 116 and back curve mold halves 108 are aligned precisely over the appropriate indentations 102A, driving the back curve mold halves 108 toward the front curve mold halves 104 by supplying a force to the flanges 109 on the perimeters of the back curve mold halves 108 may result in flexing of the back curve mold halves 108 and trapping excess liquid contact lens material 106, thereby affecting the shape of the resultant contact lenses.

In order to produce contact lenses that have uniform edges and proper thicknesses, precise closure of the contact lens molds is important. Improper closure may result in decentric lenses which produce discomfort to the wearer and misshaped lenses that reduce the subjective comfort of the wearer. Since the proper closure of the mold assemblies is crucial, methods and apparatus for closing the mold assemblies properly to produce well shaped contact lenses with minimal decentration constitute a long felt need in the field of the invention.

SUMMARY OF THE INVENTION

The present invention relates to a method and apparatus for engaging a contact lens mold assembly comprising a back curve mold half and a front curve mold half. The apparatus comprises a center touch engaging member having a center touch engaging surface for engaging a central portion of the back curve mold half during engagement of the contact lens mold assembly. The method comprises driving the back curve mold half toward the front curve mold half using the center touch engaging member to contact the central portion of the back curve mold half.

By engaging a central portion of the back curve mold half, the center touch engaging method and apparatus of the present invention are able to close the contact lens mold assembly precisely by guiding the back curve mold half into engagement with the front curve mold half. In addition, supporting the central portion of the back curve mold half prevents flexing of the portion of the back curve mold half which corresponds to the optical zones of the resultant lenses and allows excess liquid contact lens material to be expelled, thereby preventing misshaped lenses. Accordingly, the method and apparatus of the present invention enable a contact lens to be produced which is well shaped with minimal decentration, thereby producing a comfortable lens for the wearer which can adequately correct the wearer's vision.

It follows from the foregoing that an objective of the present invention is to enable precise closure of a contact lens mold assembly comprising a front curve mold half and a back curve mold half.

Another objective of the present invention is to produce a contact lens with minimal decentration.

Yet another objective of the present invention is to prevent flexing of a portion of the back curve mold half corresponding to an optical zone of a resultant contact lens during the closing of a contact lens mold assembly.

Yet another objective of the present invention is to allow excess liquid contact lens material within a contact lens assembly to be expelled.

These objectives, among others, will be made apparent to those skilled in the art by way of the following description.

BRIEF DESCRIPTION OF THE DRAWINGS

FIG. 2A is a schematic diagram of a prior art molding station of a contact lens production line system in a non-engaged state;

DETAILED DESCRIPTION OF THE INVENTION

Figure 1:
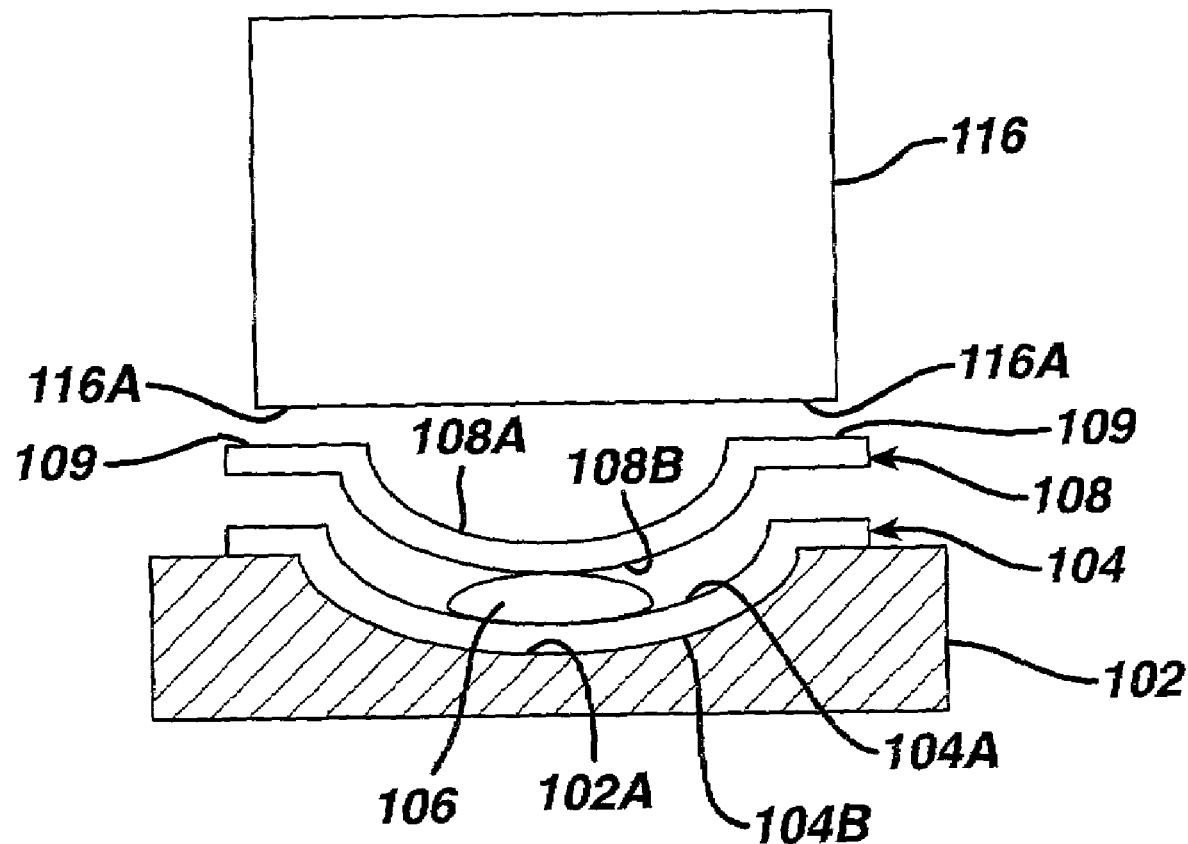
FIG. 1 is a schematic diagram of a prior art contact lens molding apparatus for forming a contact lens.
Figure 2B:
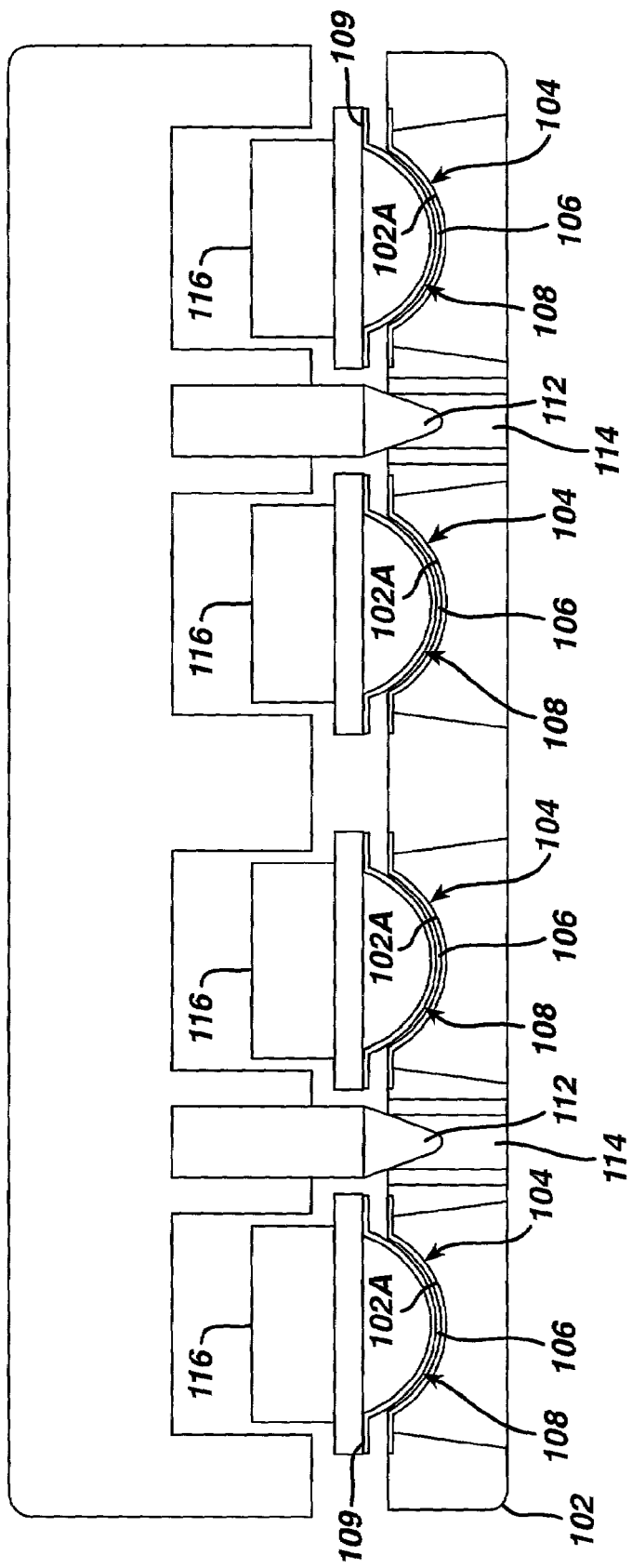
FIG. 2B is a schematic diagram of a prior art molding station of a contact lens production line system in an engaged state.
Figure 3A:
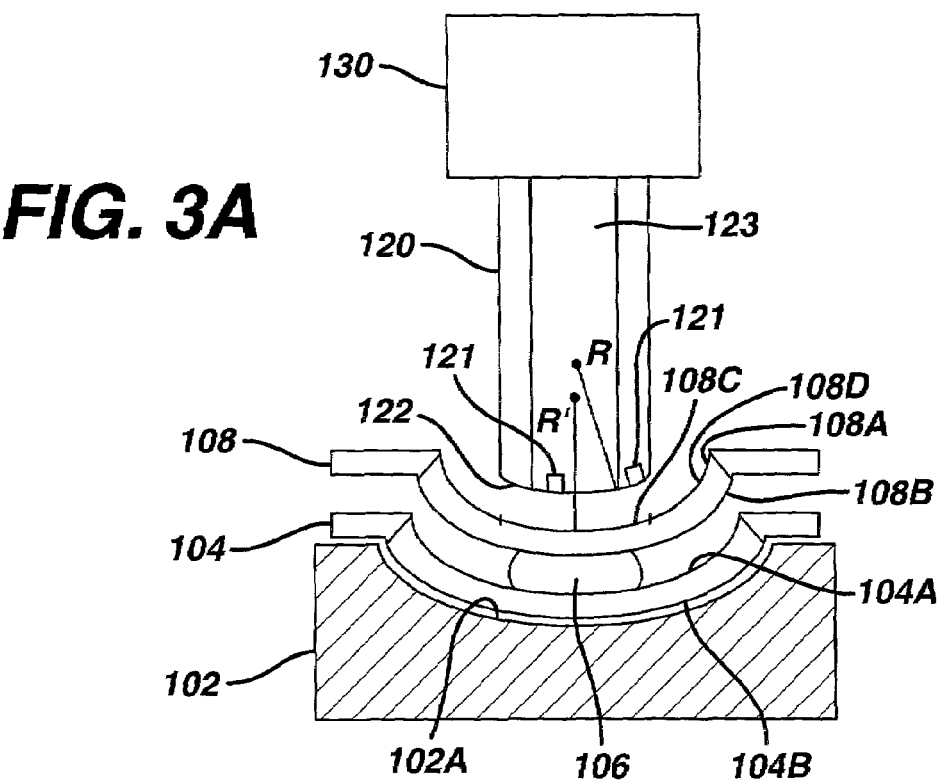
FIG. 3A is a schematic diagram of a contact lens molding apparatus for forming a contact lens in accordance with the present invention.

The present invention relates to an engaging method and apparatus for engaging a contact lens mold assembly used to form a contact lens. FIG. 3A depicts an embodiment of a molding apparatus for forming a contact lens in accordance with the present invention. The molding apparatus comprises a contact lens mold assembly (consisting of a front curve mold half 104 and a back curve mold half 108 which define a contact lens forming cavity for forming a contact lens therebetween), a carrier 102, a center touch engaging member 120, and a drive mechanism 130. The front curve mold half 104 is supported by the carrier 102 and the center touch engaging member 120 is configured to engage the back curve mold half 108. A liquid contact lens material 106 positioned between the front curve mold half 104 and the back curve mold half 108 forms a contact lens therebetween during molding. The drive mechanism 130 positions the center touch engaging member 120 and the carrier 102 relative to one another in order to engage the contact lens mold assembly.

The front curve mold half 104 contains a molding surface 104A for shaping the surface of a contact lens which is oriented away from a wearer's eye and a non-molding surface 104B opposite of the molding surface 104A. The non-molding surface 104B does not come in contact with the contact lens material 106 during the molding process.

Figure 3B:
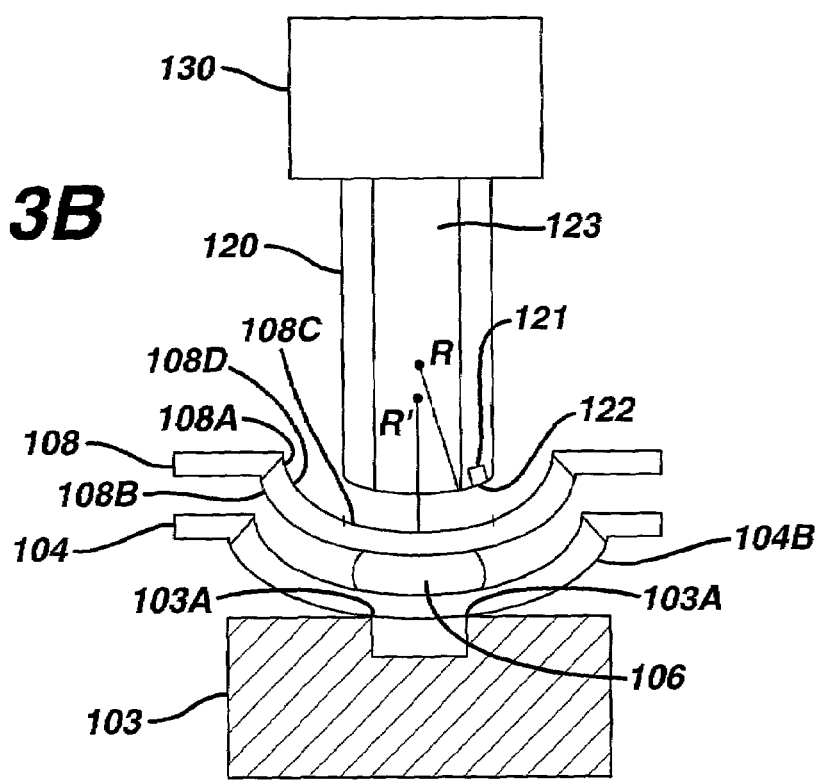
FIG. 3B is a schematic diagram of a contact lens molding apparatus having an alternative support member for forming a contact lens in accordance with the present invention.

The carrier 102 fixes the position of the front curve mold half 104. In a preferred embodiment, the carrier 102 contains an indentation 102A for receiving the front curve mold half 104 and supports the entire non-molding surface 104B of the front curve mold half 104. In an alternative embodiment, depicted in FIG. 3B, the carrier 102 includes a disc 103 which supports the non-molding surface 104B at a ring (represented by points 103A) centered around the geometric center of the front curve mold half 104. Preferably, the diameter of the ring is less than the diameter of the engaging member 120. The alternative embodiment depicted in FIG. 3B enables the front curve mold half 104 to bow outward due to pressure exerted by the back curve mold half 108 on the front curve mold half 104 and/or excess liquid contact lens material 106 trapped between the mold halves 104,108, thereby allowing the back curve mold half 108 to be properly seated within the front curve mold half 104. In yet another alternative embodiment, the carrier 102 supports the non-molding surface 104B of the front curve mold half 104 at the flanges.

The back curve mold half 108 contains a molding surface 108B for shaping the surface of a contact lens which fits against a wearer's eye and a non-molding surface 108A opposite of the molding surface 108B for receiving the center touch engaging member 120. The non-molding surface 108A does not come in contact with the contact lens material 106 during the molding process. The molding surface 108B faces the front curve mold half 104 for cooperation therewith to mold a contact lens. The back curve mold half 108 contains a molding area 108D which corresponds to the area of the back curve mold half 108 which is used to form the contact lens. In a preferred embodiment, the back curve mold half 108 is capable of passing light to cure the liquid contact lens material 106. In certain embodiments, at least a portion of the back curve mold half is transparent for passing light to cure the contact lens.

The liquid contact lens material 106 is transformed into a contact lens during the molding process. Preferably, the liquid contact lens material 106 is a liquid monomer which hardens when exposed to radiation (e.g., light). The frequency and intensity of the light received to harden the materials used to form the contact lens varies from material to material. The necessary frequency and intensity required to harden a material used in the formation of a contact lens will be readily apparent to those skilled in the art. In the preferred embodiment, the liquid contact lens material 106 is at least partially cured while the mold halves 104, 108 are engaged by the center touch engaging member 120. In alternative embodiments, the liquid contact lens material may be fully cured or not cured at all while the mold halves 104, 108 are engaged by the center touch engaging member 120.

The center touch engaging member 120 depicted in FIG. 3 contains a center touch engaging surface 122 (represented by the bottom curved edge of the center touch engaging member 120) for engaging the non-molding surface 108A of the back curve mold half 108. The center touch engaging surface 122 is configured to engage a central area 108C of the molding area 108D of the back curve mold half 108.

In the preferred embodiment, the radius of curvature R of the center touch engaging surface 122 is approximately the same as the radius of curvature R' of the non-molding surface 108A of the back curve mold half 108, thereby preventing bulging caused by R being less than R' and/or "flattening" due to R' being less than R. Also, in certain preferred embodiments, the engaging surface 122 contains channels 121 or is textured to prevent the engaging surface 122 from adhering to the non-molding surface 108A upon disengagement. In certain other preferred embodiments, the engaging surface is smooth.

The central area 108C is centered around the geometric center of the back curve mold half 108. Preferably, the central area 108C is above about 30 percent of the molding area 108D. Therefore, the center touch engaging surface 122 engages above about 30 percent of the non-molding surface 108A of the back curve mold half 108 which corresponds to the molding area 108D. As the diameter of the center touch engaging member 120 increases, it supports more of the back curve mold half 108, thereby reducing the likelihood of bulging in the portion of the back curve mold half 108 which is not supported by the center touch engaging surface 122. In certain preferred embodiments, the center touch engaging surface 122 supports at least the optical zone of the back curve mold half 108.

In a preferred embodiment, the center touch engaging member 120 is a reciprocating piston which contains a light path 123 extending through the center touch engaging member 120 for passing radiation capable of initiating curing of the liquid contact lens material 106. In accordance with certain preferred embodiments, at least a portion of the center touch engaging member 120 is transparent so as to pass the radiation used to cure the contact lens material 106. In certain other embodiments, the center touch engaging member 120 does not pass radiation.

The drive mechanism 130 positions the center touch engaging member 120 and the carrier 102 relative to one another in order to close the contact lens mold assembly. In a preferred embodiment, the drive mechanism 130 is operatively associated with the center touch engaging member 120 for supporting and moving the center touch engaging member 120 into engagement with the contact lens mold assembly on the carrier 102. Alternatively, the drive mechanism could move the carrier 102 relative to the center touch engaging member 120 or could move both the carrier 102 and the center touch engaging member 120 relative to each other. The drive mechanism 130 may be hydraulic, magnetic, mechanical, electromechanical, pneumatic or other device capable of positioning the center touch engaging member 128 and the carrier 102 in relation to one another.

Figure 4A:
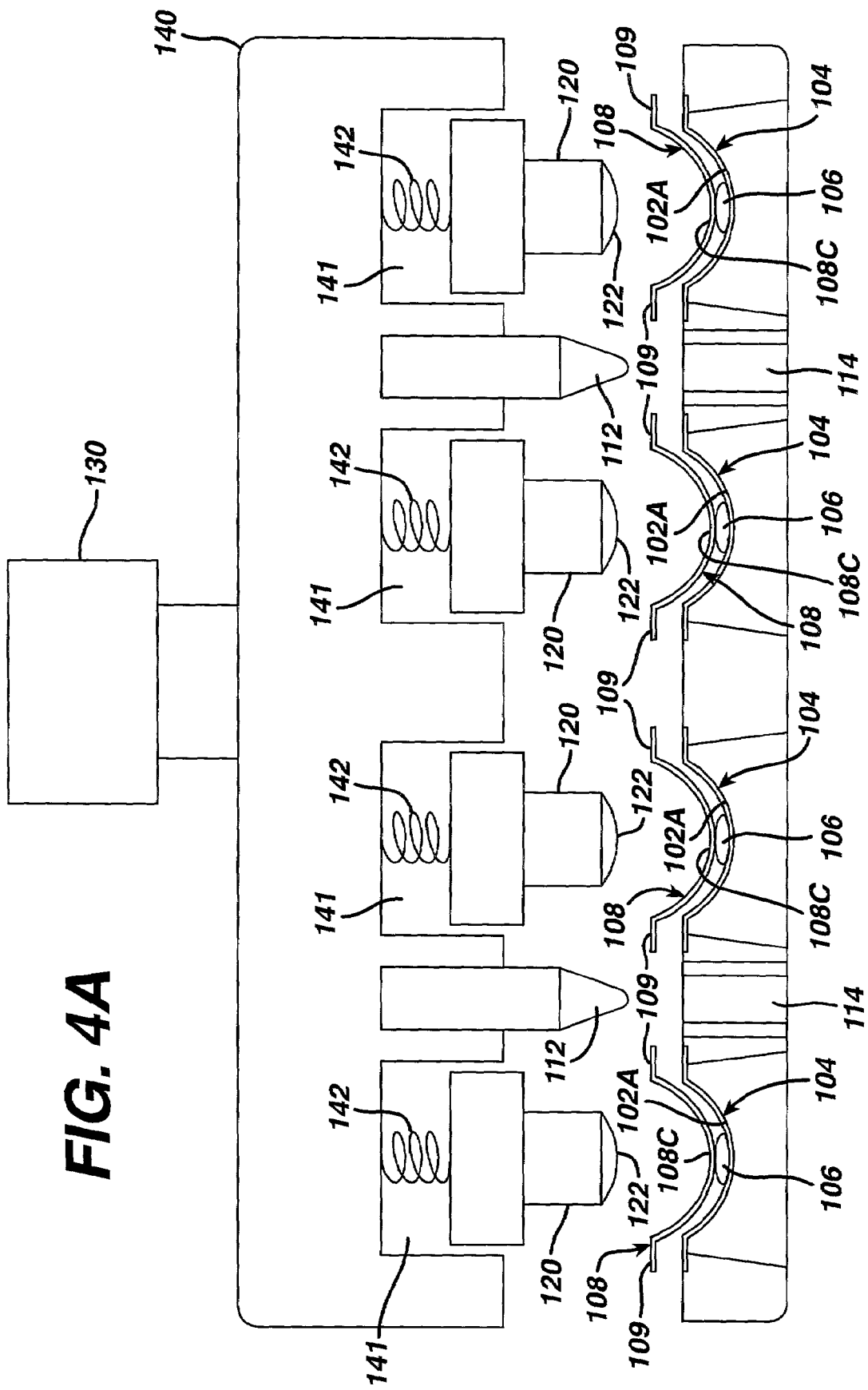
FIG. 4A is a schematic diagram of a molding station of a contact lens production line system in a non-engaged state in accordance with the present invention.
Figure 4B:
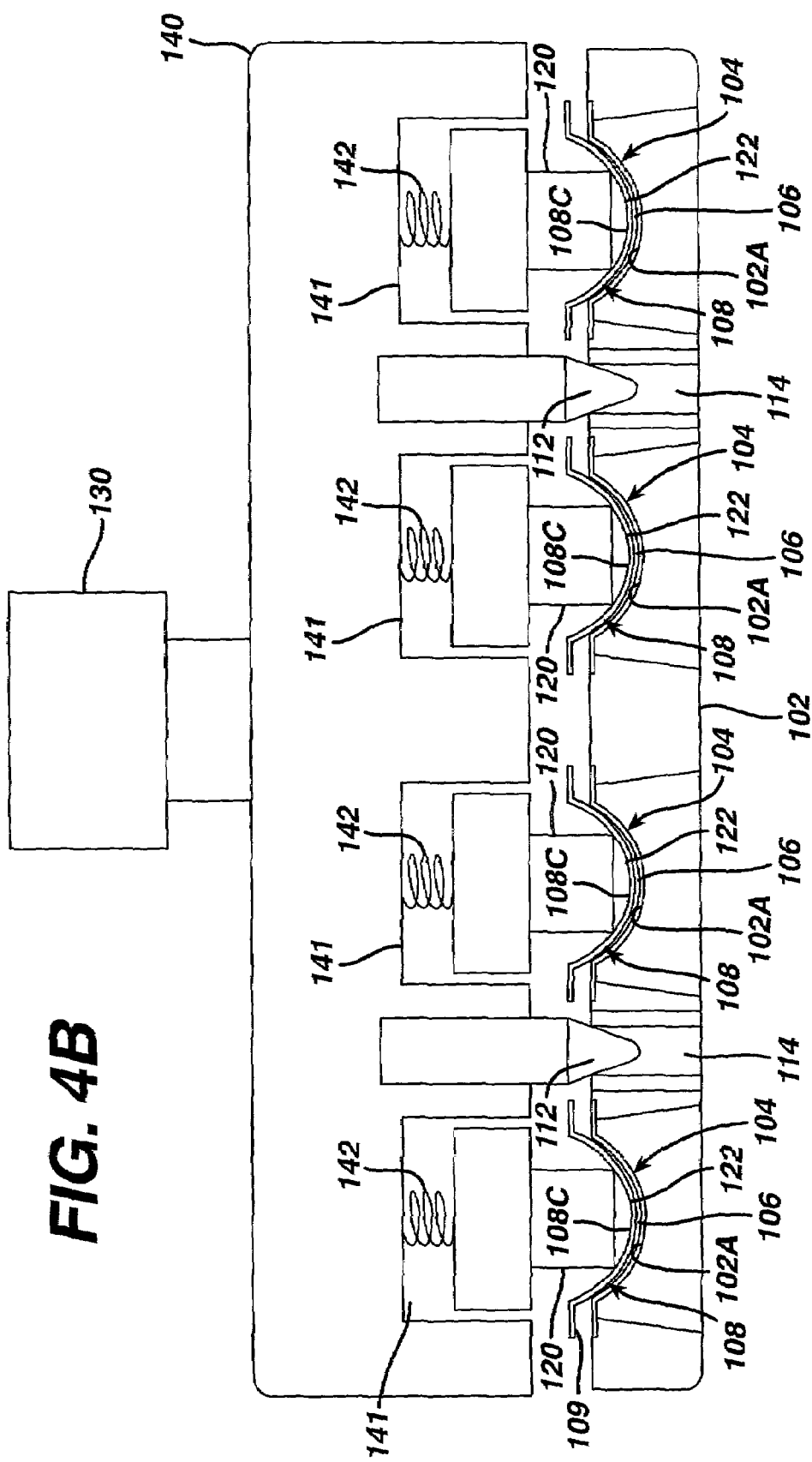
FIG. 4B is a schematic diagram of a molding station of a contact lens production line system in an engaged state in accordance with the present invention.

FIG. 4A and FIG. 4B depict a preferred center touch mold engaging station in a non-engaged state and an engaged state, respectively, for producing a plurality of contact lenses. In the preferred center touch mold engaging station, a plurality of center touch engaging members 120 are resiliently seated within recesses 141 by springs 142 of a support 140 which is driven by drive mechanism 130. The springs 142 may be mechanical springs, air springs, fluid springs, floating head, or other type of device capable of holding the center touch engaging members 120 such that they may reciprocate. In an alternative embodiment, the center touch engaging members are fixed within the support 140 and the assembly supplies a fixed load to the mold halves 104, 108.

The engaging surfaces 122 of the center touch engaging members 120 engage the central areas 108C of a plurality of back curve mold halves 108 and drive the plurality of back curve mold halves 108 towards a corresponding plurality of front curve mold halves 104 such that the centers of the front curve mold halves 104 and the centers of the back curve mold halves 108 are aligned. This arrangement results in contact lenses formed therebetween having little decentration (side-to-side difference between the center of the front surface of the contact lens and the center of the back surface of the contact lens).

Figure 4C:
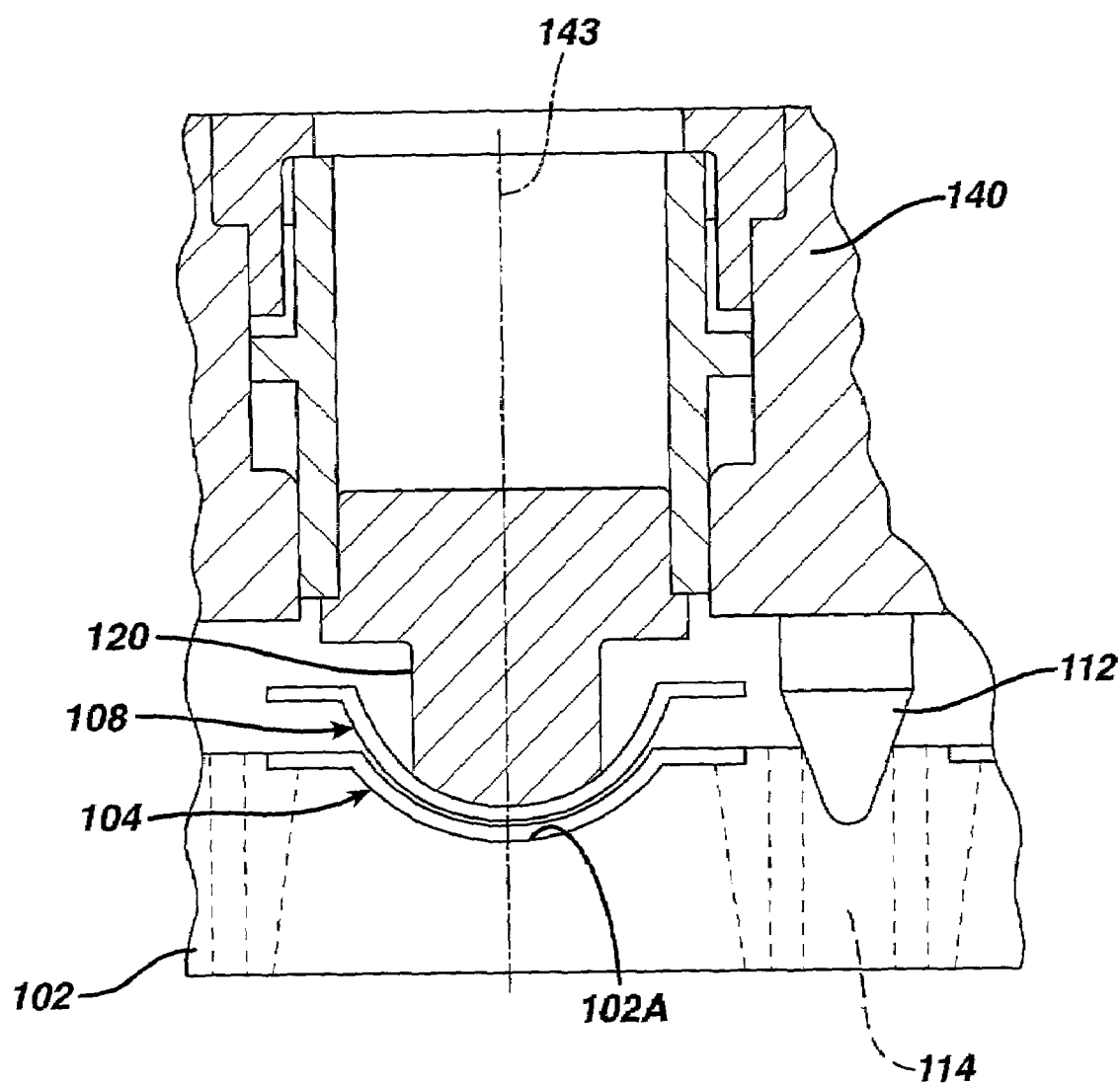
FIG. 4C is a fragmentary view illustrating a single center touch engaging member and associated registration apparatus of a molding station in accordance with the present invention.

As depicted in FIGS. 4A and 4B, the center touch mold engaging station provides registration apertures 114 in the carrier 102 and corresponding registration pins 112 associated with the engaging members 120. FIG. 4C is a fragmentary view of FIG. 4B illustrating a single center touch engaging member 120 and an associated registration pin 112 and aperture 114 for forming a single contact lens. As the engaging member 120 is moved toward the carrier 102, the registration pin 112 mates with the registration aperture 114, thereby aligning the engaging member 120 with the indentation 102A of the carrier 102 as shown by center line 143. In an alternative embodiment, registration pins and apertures are not provided.

Figure 5:
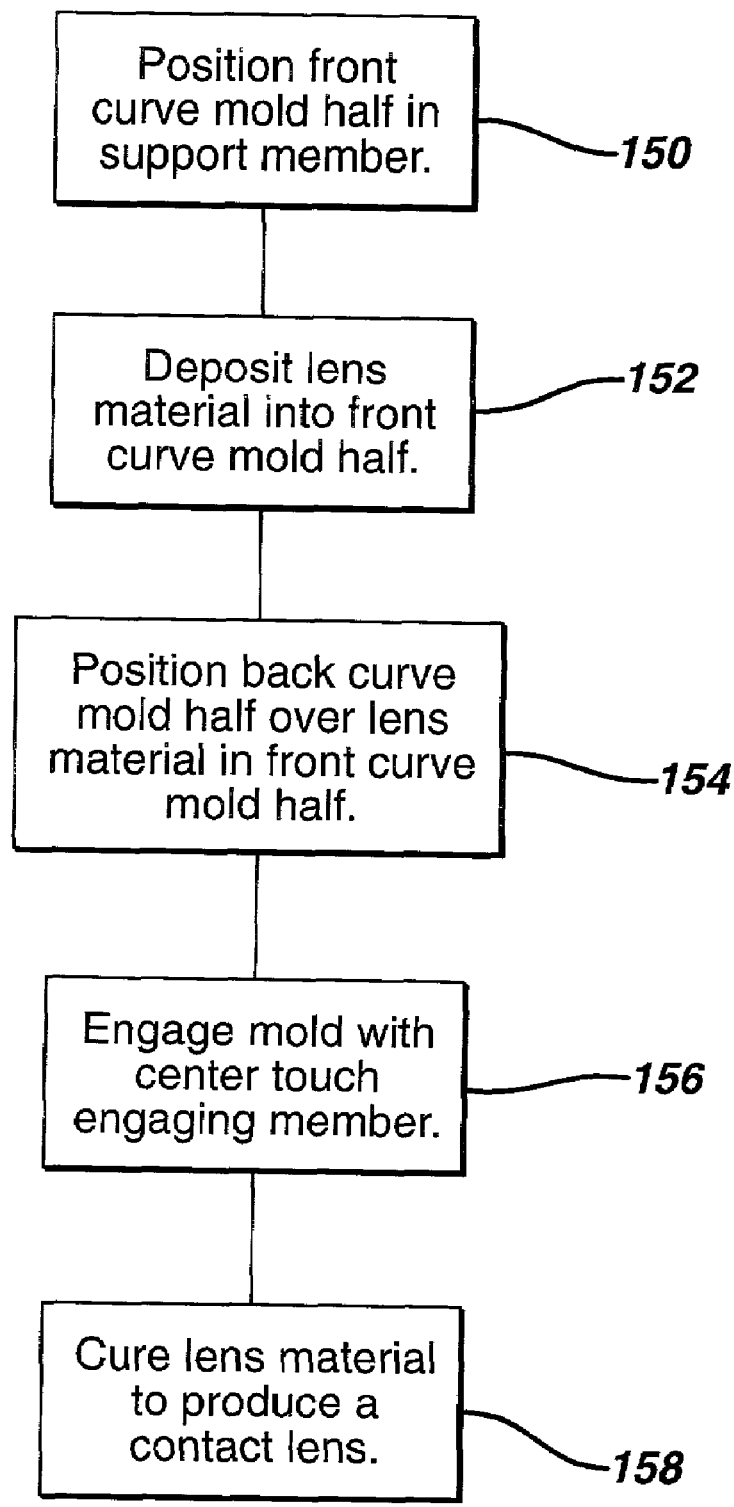
FIG. 5 is a flow diagram of a contact lens production line method in accordance with the present invention.

In use, the center touch molding apparatus and lens material depicted in FIGS. 3, 4A, and 4B can be employed to form a contact lens by following the steps of the method depicted in the flow chart of FIG. 5.

At step 1, illustrated by box 150, the front curve mold half 104 is positioned in a carrier 102. Preferably, the front curve mold half 104 is positioned within an indentation 102A of the carrier 102. In alternative embodiments, the front curve mold half 104 is positioned within a disc 103 (FIG. 3B) which supports the front curve mold half 104 at a ring 103A or the front curve mold half 104 is supported by flanges on the front curve mold half 104.

In certain embodiments, the front curve mold half 104 is removed or lifted from the indentation 102A of the carrier 102 at one or more stations during the molding process. For example, a chuck may be used to lift the front curve mold half out of the indentation 102A of the carrier 102. In other embodiments, the front curve mold half 104 remains seated within the carrier 102 throughout the molding process.

At step 2, illustrated by box 152, the liquid contact lens material 106 is deposited into the front curve mold half 104 which was positioned in the support member in step 1.

At step 3, illustrated by box 154, the back curve mold half 108 is positioned over the liquid contact lens material 106 in the front curve mold half 104.

At step 4, illustrated by box 156, the mold assembly consisting of the front curve mold half 104 and the back curve mold half 108 is closed using the center touch engaging member 120. The mold assembly is closed, thereby shaping the liquid contact lens material 106, by moving the center touch engaging member 120 toward the carrier 102 to engage a central area 108C of the back curve mold half 108 with the engaging surface 122 and drive the back curve mold half 108 toward the front curve mold half 104 and/or by moving the carrier 102 toward the center touch engaging member 120 to drive the front curve mold half 104 toward the back curve mold half 108. The drive mechanism 130 is used to position the center touch engaging member 120 and/or the carrier 102.

In a preferred embodiment, the drive mechanism 130 lowers a support 140 having a center touch engaging member 120 resiliently mounted within a recess 141 of the support 140 by a spring 142 to drive the center touch engaging member 120 toward the carrier 102. As the support 140 is lowered, the center touch engaging surface 122 of the center touch engaging member 120 engages the back curve mold half 108 and the spring 142 begins to compress. The movement of the support 140, the strength of the springs 142, and the weight of the engaging member 120 are selected such that the proper amount of force is applied to the back curve mold half 108 to close contact lens mold.

The center touch engaging surface 122 of the center touch engaging member 120 reduces improper alignment by guiding the back curve mold half 108 toward proper engagement with the front curve mold half 104 during the molding process rather than simply directing the back curve mold half 108 straight down toward the carrier 102 as in prior art systems. In addition, the center touch engaging surface 122 reduces flexing by supporting the back curve mold half 108 at the central area 108C rather than applying forces only at the perimeter of the back curve mold half 108. Also, the center touch engaging surface 122 allows excess liquid contact lens material 106 to be expelled, thereby allowing the back curve mold half 108 to be seated properly in the front curve mold half 104.

At step 5, illustrated by box 158, the liquid contact lens material 106 is cured (i.e., hardened) to form a contact lens. In a preferred embodiment, radiation (e.g., light) is passed to the shaped contact lens material through the light channel 123 extending through the center touch engaging member 120 and through the back curve mold half 108. In the preferred embodiment, the liquid contact lens material 106 is partially cured (i.e., pre-cured) during step 4, with additional steps required to fully cure the contact lens performed at other stations. In an alternative embodiment the liquid contact lens material 106 is fully cured during step 4.

In the preferred embodiment, the carrier 102, the front curve mold half 104, the back curve mold half 108, the drive mechanism 130, and the liquid contact lens material 106 are conventional. Suitable carriers, mold halves, and lens materials can be found in U.S. Pat. No. 6,071,440 to Wang et al. entitled "Contact Lens Production Line Pallet System." In some cases, the present invention may be used with other types of carriers, mold halves, and materials. For example, a back curve mold half with a convex non-molding surface could be used with a concave center touch molding surface. Also, a back curve mold half with a flat non-molding surface could be used with a flat center touch molding surface. In addition, a textured back curve mold half could be used with a mating textured center touch molding surface without departing from the scope of the present invention.

Experimental Results

Experiments were performed to compare the performance of a center touch engaging member in accordance with the present invention to an edge (flange) touch engaging member of the prior art. A force of between 1 and 3.5 ft-lbs was applied through the engaging members for a period of 110 seconds.

The objective was to identify the best set of conditions to get good quality lenses based on visual inspection (Yield [%]) by studying the effect of load, light, and support on yield for a center touch engaging member and an edge touch engaging member. The parameters for each set are set forth in table 1 below.

TABLE 1

Center/Flange Comparison

| Lot # | Description | Total # Inspected | Passed | Yield (%) |
|---|---|---|---|---|
| 734901 | No Engaging Contact | 832 | 3 | 0.4 |
| 734801 | Edge/Flange Touch | 832 | 59 | 7.1 |
| 726101 | Center Touch (8 mm diameter) | 832 | 65 | 7.8 |
| 741801 | Center Touch (5 mm diameter) | 832 | 440 | 52.9 |

All of the lenses were visually inspected for defects such as flash (i.e., excess lens material outside the perimeter of the lens), holes, chips, and nicks. The percentage of lenses which were defect free is shown in the yield [%] column.

The results indicate that under a number of different conditions, the center touch engaging member, all other things being equal, generally resulted in higher lens yields. In these experiments, critical lens parameters were not significantly impacted, thereby indicating that the center touch member will not adversely affect the optical zones of the lenses while providing the benefits as discussed above in the detailed description. It should be noted that supporting rings can be added under the front curve mold halves to flex the assemblies so as to maximize production yields. It should also be noted that the yields are dependent on the plastic mold designs and can change with various plastic mold designs used to make contact lenses.

Having thus described a few particular embodiments of the invention and experimental results which were performed, various alterations, modifications, and improvements will readily occur to those skilled in the art. For example, the present invention has been described for use in a contact lens production line, however, the present invention could be used to produce a single lens at a time. In addition, the production line has been described with the carrier moving from station to station, however, the carrier could be stationary with the stations sequentially moving to the carrier. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A contact lens station for use with a contact lens mold assembly comprising a first mold half and a second mold half for forming a contact lens therebetween, said second mold half having a molding surface facing the first mold half for cooperation therewith to mold said lens and a non-molding surface on a side of said second mold half opposite said molding surface, said non-molding surface having a central area, said contact lens station comprising:
   a carrier for fixing the position of the first mold half relative to the second mold half;
   an engaging member having an engaging surface for engaging the non-molding surface of the second mold half, said engaging surface configured for centralized engagement of the central area of the non-molding surface;
   a drive mechanism operatively associated with said engaging member for driving the mold halves together, said engaging member maintaining said mold halves in aligned relationship upon operation of said drive mechanism; and
   a light path extending through said engaging surface and said second mold half, wherein said engaging member is configured to transmit radiation along said light path capable of initiating curing of the contact lens.

2. A contact lens station in accordance with claim 1, wherein said engaging member is a reciprocating piston.

3. A contact lens station in accordance with claim 2, wherein said carrier comprises at least a plurality of indentations, one of said indentations configured to hold the contact lens mold assembly.

4. A contact lens station in accordance with claim 1,
   wherein said engaging member is a reciprocating piston;
   wherein said carrier comprises a disc, said disc configured to engage said first mold half in a ring centered around the geometric center of said first mold half.

5. A contact lens station in accordance with claim 4, wherein the diameter of said ring is less than the diameter of said engaging surface.

6. A contact lens station in accordance with claim 1, wherein said engaging surface comprises channels.

7. A contact lens station in accordance with claim 1, wherein the center area of the non-molding surface of the second mold half is concave and said engaging surface is convex.

8. A mold part for use in a contact lens station for use with a contact lens mold assembly comprising a first mold half and a second mold half, said mold halves defining a lens forming cavity therebetween for forming a contact lens, said second mold half having a molding surface facing the first mold half for cooperation therewith to mold said contact lens, and a non-molding surface on a side of said second mold half facing away from said molding surface, said non-molding surface having a central area, said mold part comprising:
   an engaging member having an engaging surface for engaging the non-molding surface of the second mold half and driving the second mold half toward the first mold half, said engaging surface configured to engage the central area of the non-molding surface; and
   a light path extending through said engaging member and the second mold half, and wherein said engaging member is configured to transmit light along said light path for pre-curing the contact lens.

9. A mold part in accordance with claim 8, wherein said engaging member is a reciprocating piston.

10. A mold part in accordance with claim 8, wherein the central area of the non-molding surface of the second mold half is concave and said engaging surface is convex.

11. A mold part in accordance with claim 1, wherein the central area of the second mold half and said engaging surface have the same radius.

12. A mold part in accordance with claim 8, further comprising:
   registration pins associated with said engaging member corresponding to registration apertures associated with said first mold half, said first mold half and said engaging member being aligned precisely when said registration apertures are mated with said registration pins.

13. A mold part in accordance with claim 1, wherein said engaging surface comprises channels.

* * * * *